United States Patent
Stefani et al.

(10) Patent No.: US 8,366,584 B2
(45) Date of Patent: Feb. 5, 2013

(54) METHOD FOR STARTING A THERMAL ENGINE OF A HYBRID VEHICLE

(75) Inventors: Giovanni Stefani, Cadiroggio (IT); Franco Cimatti, Pavullo (IT); Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 413 days.

(21) Appl. No.: 12/766,503

(22) Filed: Apr. 23, 2010

(65) Prior Publication Data

US 2010/0300391 A1    Dec. 2, 2010

(30) Foreign Application Priority Data

Apr. 28, 2009    (IT) ............................... BO2009A0261

(51) Int. Cl.
*B60W 10/02* (2006.01)
*F16H 47/08* (2006.01)
(52) U.S. Cl. ............................................. 477/5; 477/98
(58) Field of Classification Search ................ 477/5, 98; 180/65.275; 18/65.285
See application file for complete search history.

(56) References Cited

U.S. PATENT DOCUMENTS

| | | | | |
|---|---|---|---|---|
| 4,335,429 | A * | 6/1982 | Kawakatsu | 701/102 |
| 5,337,848 | A | 8/1994 | Bader | |
| 6,098,584 | A | 8/2000 | Ahner et al. | |
| 6,354,974 | B1 | 3/2002 | Kozarekar | |
| 2002/0117860 | A1 | 8/2002 | Man et al. | |
| 2004/0121882 | A1* | 6/2004 | Tajima et al. | 477/3 |
| 2005/0101432 | A1* | 5/2005 | Pels et al. | 477/5 |
| 2005/0155803 | A1 | 7/2005 | Schiele | |
| 2007/0272456 | A1* | 11/2007 | Shiiba | 180/65.2 |
| 2009/0017988 | A1 | 1/2009 | Reuschel | |
| 2009/0308673 | A1 | 12/2009 | Seel | |

FOREIGN PATENT DOCUMENTS

| | | |
|---|---|---|
| DE | 19645943 A1 | 5/1998 |
| DE | 102007052737 A1 | 6/2008 |
| FR | 2912190 A1 | 8/2008 |
| GB | 2335404 A | 9/1999 |
| GB | 2413998 A | 11/2005 |
| GB | 2416808 A | 2/2006 |
| WO | WO-2007131838 A1 | 11/2007 |

OTHER PUBLICATIONS

"Italian Application Serial No. IT B020090261, Search Report dated Feb. 24, 2010", 2 pgs.
"European Application Serial No. EP 10160666, European Search Report mailed Jul. 6, 2010", 4 pgs.

* cited by examiner

*Primary Examiner* — Roger Pang
(74) *Attorney, Agent, or Firm* — Schwegman Lundberg & Woessner, P.A.

(57) ABSTRACT

A method for starting an internal combustion thermal engine of a hybrid vehicle having: the thermal engine provided with a drive shaft; at least one pair of driving wheels; a transmission, which transmits the motion from the thermal engine to the driving wheels and has a clutch; and an electric machine, which is mechanically connected to the clutch downstream of the clutch, so that the clutch is interposed between the electric machine and the thermal engine; the starting method includes the steps of: opening the clutch to separate the electric machine from the thermal engine; separating the electric machine from the driving wheels; making the electric machine rotate by operating the electric machine as a motor; and closing the clutch when the electric machine reaches a launch rotation speed.

13 Claims, 4 Drawing Sheets

METHOD FOR STARTING A THERMAL ENGINE OF A HYBRID VEHICLE

RELATED APPLICATIONS

This application claims priority, under 35 U.S.C. Section 119, to Italian Patent Application Ser. No. B02009A 000261 filed on Apr. 28, 2009, which is incorporated herein by reference in its entirety.

TECHNICAL FIELD

The present invention relates to a method for starting an internal combustion engine of a hybrid vehicle.

BACKGROUND

A hybrid vehicle comprises an internal combustion thermal engine, which transmits torque to the driving wheels by means of a transmission provided with a gear box, and at least one electric machine which is electrically connected to an electric storage system and mechanically connected to the driving wheels.

The following is possible while traveling: either a thermal operating mode, in which the torque is generated only by the thermal engine and the electric machine may possibly work as a generator for recharging the storage system; or an electric operating mode, in which the thermal engine is off and the torque is generated only by the electric machine working as a motor; or a combined operating mode, in which the torque is generated both by the thermal engine and by the electric machine working as a motor. Furthermore, in order to increase the overall energy efficiency during all steps of decelerating, the electric machine may be used as a generator for a regenerative deceleration in which the kinetic energy possessed by the vehicle is partially converted into electricity, which is stored in the storage system, instead of being completely dissipated in friction within the brakes.

When the electric machine is disconnectable from the driving wheels, i.e. when the electric machine is mechanically connected to a primary gear box shaft or is directly mechanically connected to a drive shaft of the thermal engine, the electric machine may be used to start the thermal engine itself, thus also serving the function of a starter motor (as described, for example, in patent U.S. Pat. No. 5,337,848A1 and in patent application GB2335404A). When the thermal engine is "cold", the thermal engine requires the application of a very high torque (indicatively even 2-4 times higher than the starting torque needed to start a "warm" thermal engine) to the drive shaft, because due to the low temperature, the lubricant oil inside the thermal engine is not very fluid and thus opposes a high mechanical resistance. A traditional starter motor is able to apply a very high torque to the drive shaft of the thermal engine by virtue of a very high gear-down ratio (e.g. even 1:10) between the starter motor and the drive shaft; instead, the electric machine of a hybrid vehicle is normally mechanically connected to the drive shaft of the thermal engine with a low gear-down ratio (often unitary, i.e. 1:1, and thus without any gear-down). Therefore, the electric machine of a hybrid vehicle may not be capable of generating the very high starting torque needed to start the thermal engine when the thermal engine is "cold".

In order to solve the above-described problem, in patent application US2002117860A1 it is suggested to mechanically couple the electric machine to the drive shaft of the thermal engine with two different, automatically selectable transmission ratios: a first more geared-down ratio is selected during a step of starting the thermal engine, while a second, more direct ratio (i.e. less geared-down ratio) is selected for the remaining use of the electric machine. However, this solution is constructionally complex because a servo-controlled gear box should be interposed between the electric machine and the drive shaft.

In order to solve the above-described drawback, in patent applications WO2007131838A1, US2005155803A1, U.S. Pat. No. 6,354,974A1 and US2009017988A1 the electric machine is separated from the drive shaft of the thermal engine by a clutch; in order to start the thermal engine, the clutch is opened, the electric machine is "idled" and the clutch is closed with the electric machine rotating so as to also exploit the inertia (i.e. the kinetic energy) of the electric machine for making the thermal engine rotate. However, such a "launched" starting mode may also not be sufficient to start a sporty, high-performance thermal engine which has a high displacement and with a high number of cylinders. Furthermore, the "launched" starting mode allows to apply a high starting torque to the drive shaft needed to start a "cold" thermal engine, but which is redundant to start a "warm" thermal engine; therefore, when the thermal engine is "warm", the "launched" starting mode may unnecessarily impose high mechanical stresses on the transmission components and unnecessarily determines a certain delay when starting the thermal engine due to the time needed to "idle" the electric machine.

Patent application DE19645943A1 describes starting the thermal engine with a "launched" starting mode (which includes making the electric motor rotate before mechanically connecting the electric machine to the thermal engine) when the thermal engine is "cold" and using a conventional starting mode (in which the electric machine is mechanically connected to the thermal engine before it starts to rotate) when the thermal engine is "warm".

Patent application GB2413998A describes starting the thermal engine with a "launched" starting mode (which includes making the electric machine rotate before mechanically connecting the electric machine to the thermal engine); the launch rotation speed (i.e. the rotation speed which should be reached by the electric machine before mechanically connecting the electric machine to the thermal engine) is determined according to the temperature of the thermal engine so that the launch rotation speed is higher when the thermal engine is "cold".

SUMMARY

Examples described here provide a method for starting a thermal engine of a hybrid vehicle, which method is free from the above-described drawbacks while being easy and cost-effective to be implemented.

According to several examples, a method for starting a thermal engine of a hybrid vehicle is provided as claimed in the attached claims.

BRIEF DESCRIPTION OF THE DRAWINGS

Certain examples will now be described with reference to the accompanying drawings, which illustrate some non-limitative embodiments thereof, in which.

DETAILED DESCRIPTION

Figure 1:
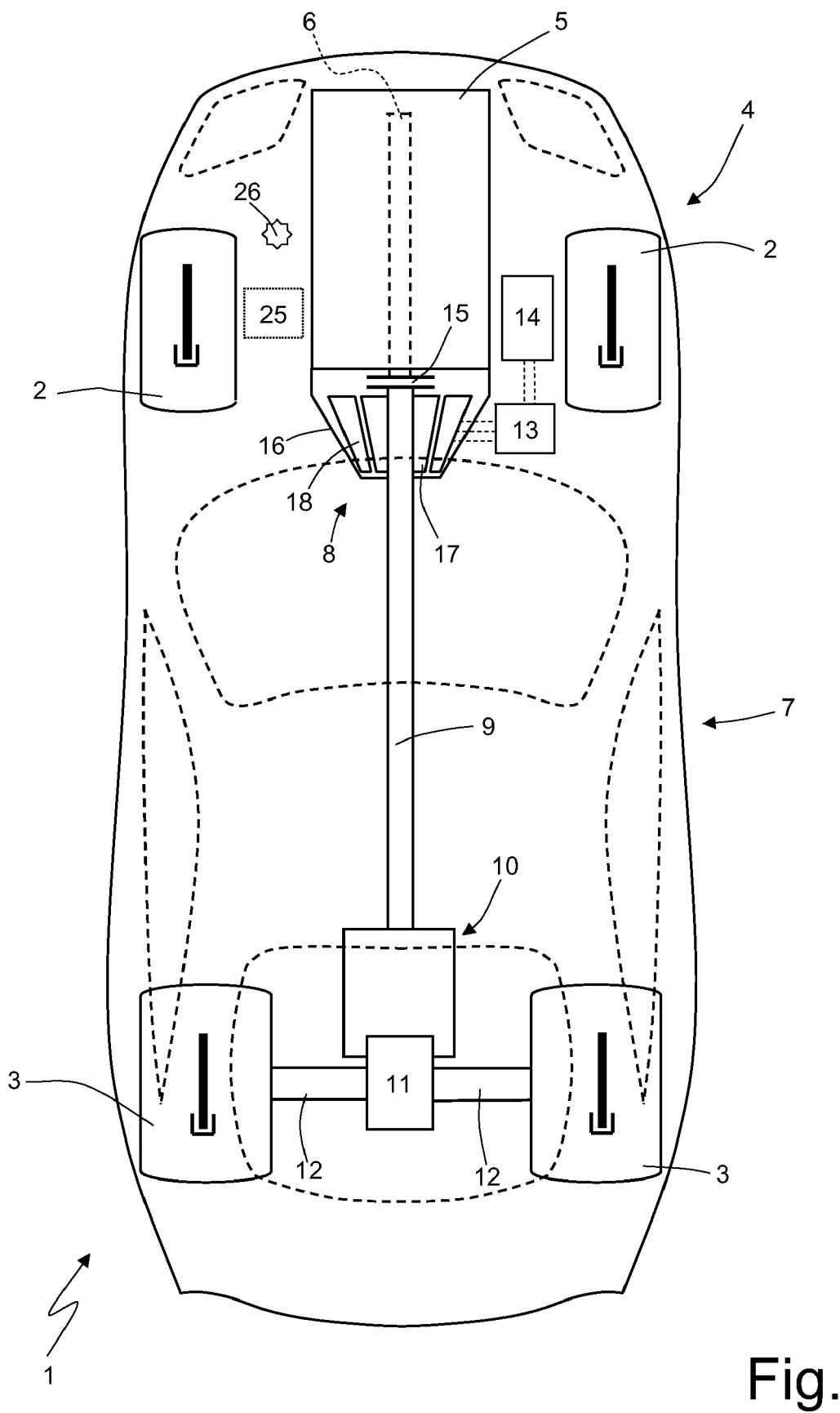
FIG. 1 is a diagrammatic view of a road vehicle with hybrid propulsion which implements the method of starting a thermal engine.

In FIG. 1, numeral 1 indicates as a whole a road vehicle with hybrid propulsion provided with two front wheels 2 and two rear driving wheels 3, which receive torque from a hybrid propulsion system 4.

The hybrid propulsion system 4 comprises an internal combustion thermal engine 5, which is arranged in a frontal longitudinal position and is provided with a drive shaft 6, a servo-controlled transmission 7 which transmits the torque generated by the thermal engine 5 to the rear driving wheels 3, and a reversible electric machine 8 (i.e. an electric machine which may work either as an electric motor, using electricity and generating mechanical torque, and as an electric generator, using mechanical energy and generating electricity), which is mechanically connected to the servo-controlled transmission 7.

The servo-controlled transmission 7 comprises a transmission shaft 9, which at one end is angularly integral with the drive shaft 6, and at the other end is mechanically connected to a servo-controlled gear box 10, which is arranged in a rear position and transmits motion to the rear driving wheels 3 by means of two axle shafts 12, which receive motion from a differential 11. The reversible electric machine 8 is mechanically connected to the transmission shaft 9, as described in greater detail below, and is driven by an electronic power converter 13 connected to an electric storage system 14, typically consisting of a pack of chemical batteries possibly connected in parallel to one or more supercapacitors.

The servo-controlled transmission 7 comprises a servo-controlled clutch 15, which is interposed between the drive shaft 6 of the thermal engine 5 and the transmission shaft 9, serving the function of disconnecting the transmission shaft 9 from the thermal engine 5, and is preferably accommodated in a bell 16 integral with the crankcase of the thermal engine 5.

As shown in FIG. 1, the electric machine 8 comprises a rotor 17, which is directly keyed onto the transmission shaft 9, and a stator 18 which is arranged about the rotor 16 and electrically coupled to the electric drive 13. In other words, the transmission shaft 9 also serves the function of a shaft of the electric machine 8 which is thus free from dedicated shafts. Rotor 17 and stator 18 of the electric machine 8 preferably have a truncated-cone shape which is gradually tapered along the transmission shaft 9 from the thermal engine 5 towards the gear box 10 (i.e. the larger diameter is facing the thermal engine 5 and the smaller diameter is facing the gear box 10). The electric machine 8 is accommodated within the bell 16; since the shape of the bell 16 is not cylindrical due to the typical dimensions of these vehicle architectures, the available space within the bell 16 itself may be efficiently occupied only if the electric machine 8 is shaped to follow the shape of the bell 16, i.e. only if the electric machine 8 is truncated-cone in shape.

Figure 2:
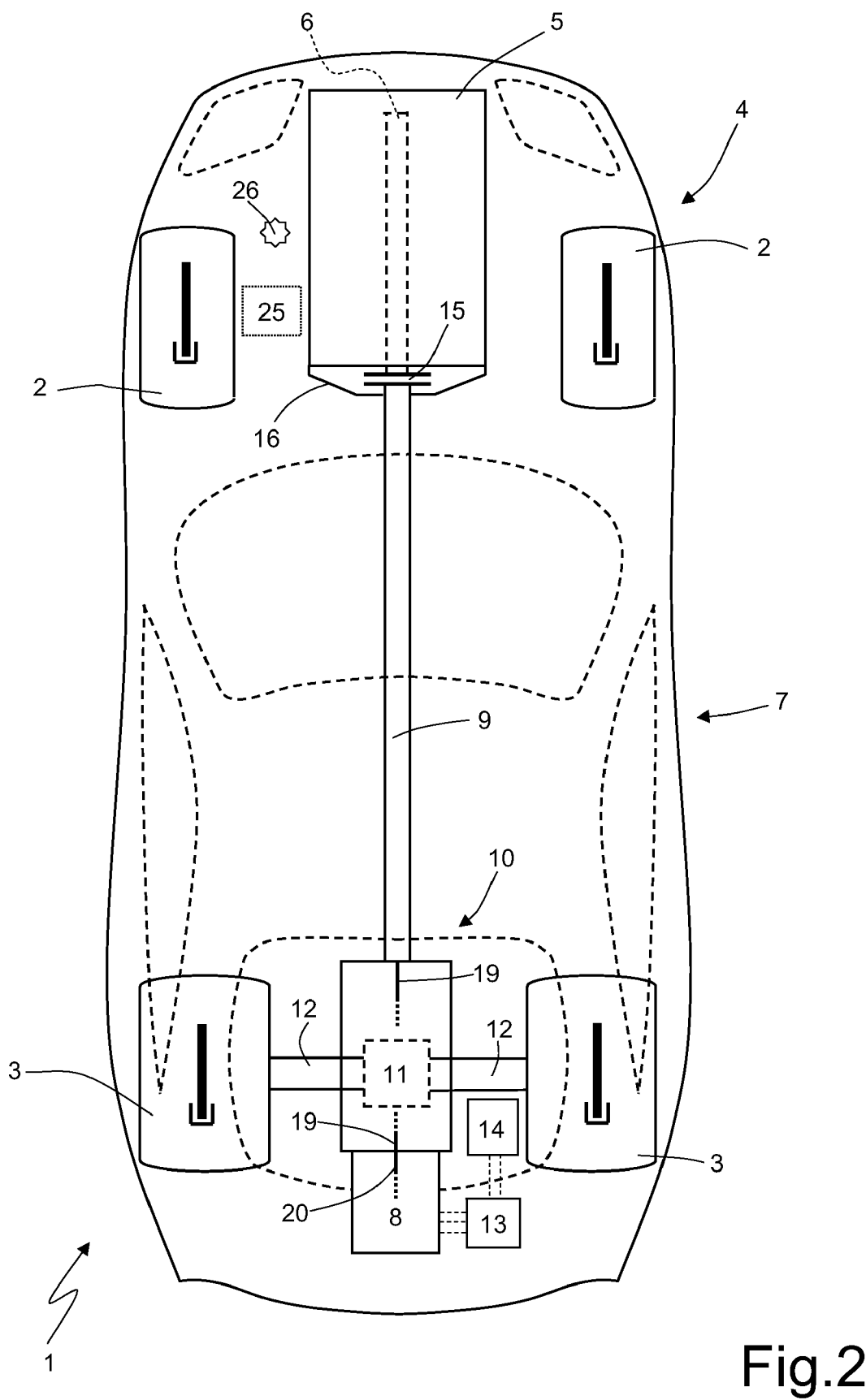
FIG. 2 is a diagrammatic view of an alternative embodiment of the road vehicle in FIG. 1.

According to the alternative embodiment shown in FIG. 2, the electric machine 8 is not directly coupled to the transmission shaft 9, but is coupled to the gear box 10. In particular, the gear box 10 comprises a primary shaft 19, which is permanently integral with the transmission shaft 9, and a secondary shaft (not shown) which is mechanically coupled to the primary shaft 19 by means of a plurality of gear pairs, each of which defines a respective speed, and comprises a primary gear mounted to the primary shaft 19 and a secondary gear mounted to the secondary shaft which meshes with the primary shaft. The shaft 19 of the gear box 10 is permanently integral with a shaft 20 of the electric machine 8; therefore, the electric machine 8 is mechanically restrained to the primary shaft 19 of the gear box 10.

Figure 3:
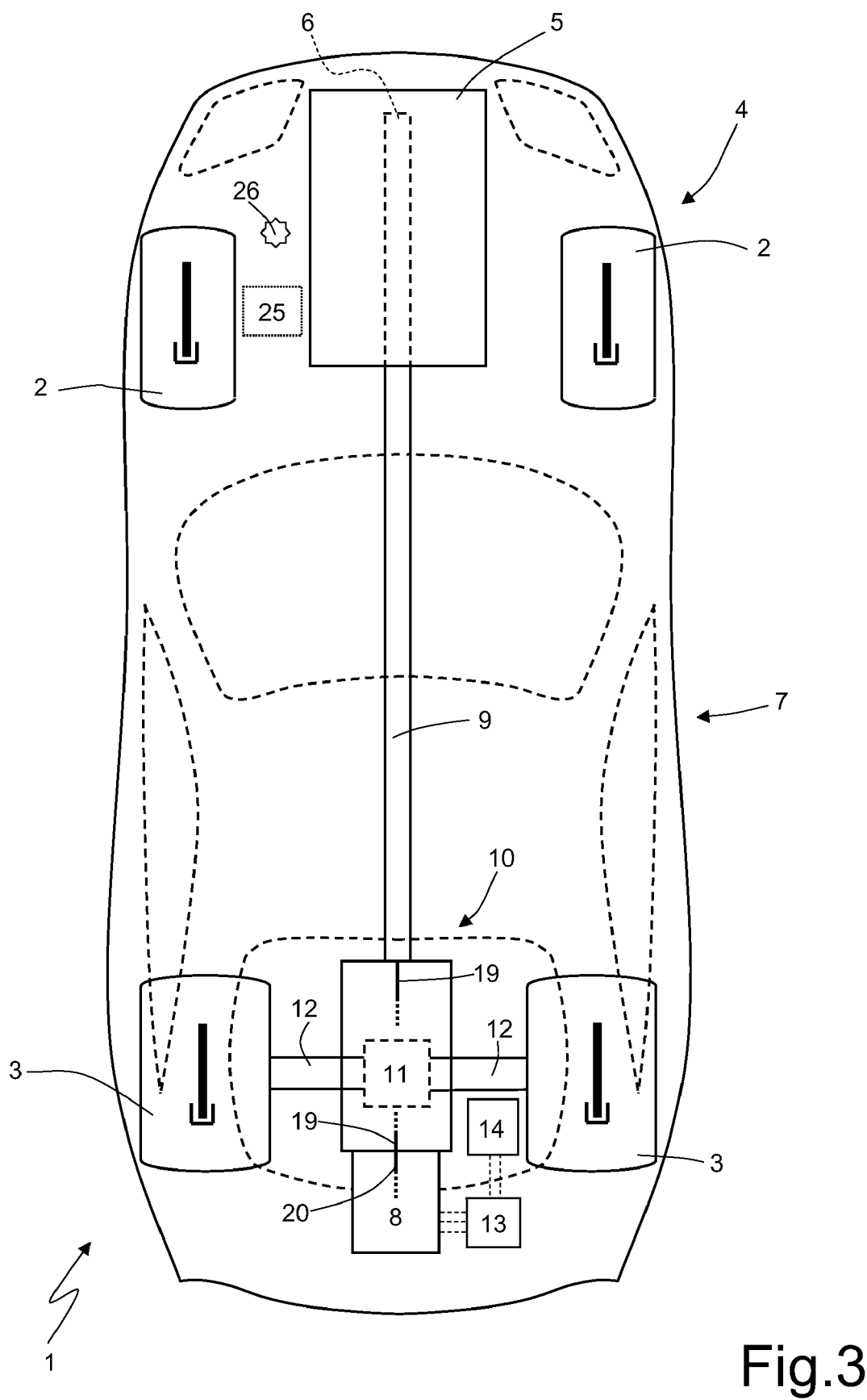
FIG. 3 is a diagrammatic view of a further embodiment of the road vehicle in FIG. 1.
Figure 4:
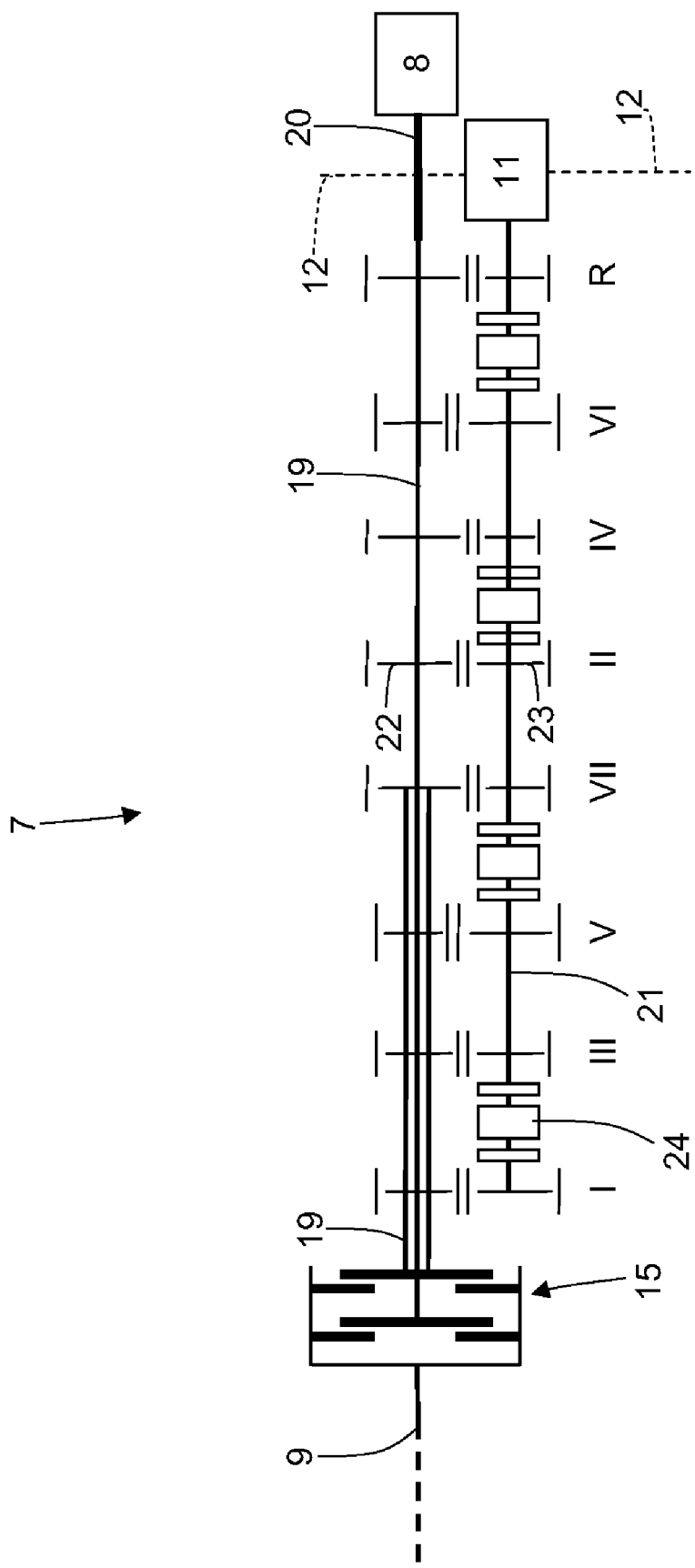
FIG. 4 is a diagrammatic view of a double-clutch gear box of the road vehicle in FIG. 3.

According to alternative embodiment shown in FIG. 3, the gear box 10 is of the double-clutch type and thus integrates two coaxial clutches 15 therein, which are arranged in series (shown in FIG. 4). With reference to FIG. 4, the double-clutch gear box 10 comprises a pair of independent primary shafts 9 (one of which is mechanically connected to the shaft 20 of the electric machine 8) which are coaxial to and inserted within each other. Furthermore, the double-clutch gear box 10 comprises two coaxial clutches 15 arranged in series, each of which is adapted to connect a respective primary shaft 19 to the drive shaft 6 of engine 5 by interposing the transmission shaft 9. The double-clutch gear box 10 comprises a single secondary shaft 21 connected to the differential 11 which transmits motion to the rear driving wheels 3; according to an alternative, equivalent embodiment, the double-clutch gear box 10 comprises two secondary shafts 21 both connected to the differential 11.

The double-clutch gear box 10 has seven forward speeds indicated by Roman numerals (first gear I, second gear II, third gear III, fourth gear IV, fifth gear V, sixth gear VI and seventh gear VII) and one reverse (indicated by the letter R). Each primary shaft 19 and the secondary shaft 21 are mechanically coupled to each other by means of a plurality of gear pairs, each of which defines a respective speed and comprises a primary gear 22 mounted to the primary shaft 19 and a secondary gear 23 mounted to the secondary shaft 21. In order to allow the correct operation of the double-clutch gear box 10, all the odd speeds (first gear I, third gear III, fifth gear V, seventh gear VII) are coupled to the same primary shaft 5a, while all the even speeds (second gear II, fourth gear IV, and sixth gear VI) are coupled to the other primary shaft 19.

Each primary gear 22 is keyed onto a respective primary shaft 19 to rotate, again integrally, with the primary shaft 19 itself, and permanently meshes with the respective secondary gear 23; instead, each secondary gear 23 is idly mounted to the secondary shaft 21. Furthermore, the double-clutch gear box 10 comprises four double synchronizers 24, each of which is coaxially mounted to the secondary shaft 21, is arranged between two secondary gears 23, and is adapted to be operated to alternatively engage the two respective secondary gears 23 onto the secondary shaft 21 (i.e. to alternatively make the two respective secondary gears 23 angularly integral with the secondary shaft 21). In other words, each synchronizer 24 may be displaced either in one direction to engage a secondary gear 23 onto the secondary shaft 21, or it may be displaced in the other direction to engage the other secondary gear 23 onto the secondary shaft 21.

As shown in FIGS. 1, 2 and 3, vehicle 1 comprises a control unit 25 which governs the operation of the propulsion system 4, and thus the operation of thermal engine 5, transmission 7 and electric machine 8. Inter alia, the control unit 25 is connected to a temperature sensor 26 which detects the temperature of a cooling liquid of the thermal engine 5.

The modes used by the control unit 25 to start the thermal engine 5 when vehicle 1 is stationary are described below.

In order to start the thermal engine 5 when vehicle 1 is stationary, the control unit 25 opens the clutch 15 to separate the electric machine 8 from the thermal engine 5, while separating the electric machine 8 from the driving wheels 3 by putting the primary shaft 19 of the gear box 10 (or, in the case of a double-clutch gear box 10, the primary shaft 19 associated with the electric machine 8) in neutral. At this point, the electric machine 8 is run as a motor to generate torque, and therefore the electric machine 8 along with the part of transmission 7 which is angularly integral with the electric machine 8 itself starts rotating; when the electric machine 8 has reached a desired launch rotation speed (typically at least equal to the idling speed of the thermal engine 5), the control unit 25 closes the clutch 15 so as to form a mechanical connection between the shaft 20 of the electric machine 8 and the drive shaft 6 of the thermal engine 5, thus ensuring that the electric machine 8 makes the thermal engine 5 rotate.

When and/or after closing the clutch 15, the intensity of the electric current supplied to the electric machine 8 is increased to overload the electric machine 8, by supplying an electric current to the electric machine 8 itself, which electric current has a higher intensity than the nominal intensity (i.e. the maximum intensity that the machine may continuously withstand without damages), to make the electric machine generate a higher torque than the nominal torque. Thereby, when starting the thermal engine 5, a high starting torque is applied to the drive shaft 6 of the thermal engine 5.

In order to accelerate the electric machine 8 from zero to the desired launch rotation speed, the electric machine 8 is preferably supplied with electric current having an intensity equal to the nominal intensity (such an acceleration step should occur as rapidly as possible to reduce the total time needed to start the thermal engine 5 to the minimum), and when and/or after closing the clutch 15, the intensity of the electric current supplied to the electric machine 8 is then increased in steps so as to overload the electric machine 8, as described above.

Proceeding as described above, the torque (higher than the nominal torque) generated by the electric machine 8 is completely used to make the drive shaft 6 of the thermal engine 5 rotate, because the electric machine 8 (along with the parts of transmission 7 angularly integral with the electric machine 8) has already been rotated before. Furthermore, proceeding as described above, part of the kinetic energy possessed by the electric machine 8 (and by the parts of transmission 7 angularly integral with the electric machine 8) may be transmitted to the drive shaft 6 of the thermal engine 5; in this case, the launch rotation speed of the electric machine 8 is faster than the idling speed of the thermal engine 5, and while starting the thermal engine 5, the electric machine 8 undergoes a deceleration which determines a transfer of part of the kinetic energy possessed by the electric machine 8 (and by the parts of the transmission 7 angularly integral with the electric machine 8) to the drive shaft 6 of the thermal engine 5.

In other words, over a short time, both the mechanical energy generated by the electric machine 8 and part of the kinetic energy possessed by the electric machine 8 (and by the parts of transmission 7 angularly integral with the electric machine 8), which therefore slows down, are transferred to the drive shaft 6 of the thermal engine 5; therefore, a total starting torque is applied to the drive shaft 6 of the thermal engine 5, which torque is given by the sum of the torque generated by the electric machine 8 and the braking torque applied to the shaft 20 of the electric machine 8. In this case, the clutch 15 is highly stressed because the faster the launch speed of the electric machine 8, the longer the clutch 15 should slip to adapt the speed between the shaft 20 of the electric machine 8 and the drive shaft 6 of the thermal engine 5; however, the total torque which should be transferred by the clutch 15 when starting the thermal engine 5 is a fraction of the nominal torque of clutch 15, and therefore even when the launch rotation speed of the electric machine 8 is particularly high, the clutch 15 is certainly not excessively stressed (i.e. stressed beyond its nominal capacity). It is worth noting that by varying the closing speed of the clutch 15, the torque which is applied to the drive shaft 6 of the thermal engine 5 is varied due to the speed reduction of the electric machine 8 (and of the parts of transmission 7 angularly integral with the electric machine 8); that is, the faster the clutch 15 is closed, the faster the rotation speed of the electric machine 8 decreases, and thus the higher the torque applied to the drive shaft 6 of the thermal engine 5 due to the speed reduction of the electric machine 8.

Before starting the thermal engine 5, the control unit 25 determines the temperature of the thermal engine 5 by reading the measurement provided by the temperature sensor 26 of the cooling liquid of the thermal engine 5. Therefore, when the control unit 25 determines the overload of the electric machine 8 thus determining the increased intensity of the electric current supplied to the electric machine 8 as compared to the nominal intensity according to the temperature of the thermal engine 5; in particular, the increase of the intensity of the electric current supplied to the electric motor 8 as compared to the nominal intensity is inversely proportional to the temperature of the thermal engine 5, thus the lower the temperature of the thermal engine 5, the higher the increase of intensity of the electric current supplied to the electric machine 8 as compared to the nominal intensity, and vice versa. In other words, the lower the temperature of the thermal engine 5, the higher the starting torque to be applied to the drive shaft 6 of the thermal engine 5, and thus the higher the overload of the electric machine 8.

Moreover, before starting the thermal engine 5, the control unit 25 determines the launch rotation speed of the electric machine 8 (i.e. the rotation speed of the electric machine 8 in the moment of closing the clutch 15) according to the temperature of the thermal engine 5; in particular, the launch rotation speed is inversely proportional to the temperature of the thermal engine 5, and therefore the lower the temperature of the thermal engine 5, the higher the launch rotation speed. In other words, the lower the temperature of the thermal engine 5, the higher the starting torque to be applied to the drive shaft 6 of the thermal engine 5, and thus the higher the kinetic energy which should be transmitted from the electric machine 8 (and from the parts of transmission 7 angularly integral with the electric machine 8) to the thermal engine 5 (i.e. the higher the launch rotation speed). It is worth noting that the starting time (i.e. the interval of time needed to start the thermal engine 5) is quite constant, and therefore the higher the launch rotation speed, the faster the clutch 15 should (may) be closed, and therefore the higher the kinetic energy transmitted by the electric machine 8 (and the parts of transmission 7 angularly integral with the electric machine 8) to the thermal engine 5, the higher the torque applied to the drive shaft 6 of the thermal engine 5 due to of the speed reduction of the electric machine 8. In other words, the control unit 25 determines the closing speed of the clutch 15 according to the launch rotation speed, i.e. the higher the launch rotation speed, the faster the closing speed of the clutch 15.

From the above, it is apparent that the control unit 25 adjusts both the launch rotation speed of the electric machine 8 when the clutch 15 is closed, and the overload amount of the electric machine 8 while/after closing the clutch 15 according to the temperature of the thermal engine 5 (i.e. the temperature of the cooling liquid of the thermal engine 5); thereby, when the thermal engine 5 is "cold", i.e. the torque required for starting is higher due to the hydraulic resistance generated by the lubricant, the launch rotation speed of the electric machine 8 when the clutch 15 is closed may be increased and/or the overload amount of the electric machine 8 may be increased.

According to an embodiment, before starting the thermal engine 5, the control unit 25 also determines the temperature of the electric machine 8, and thus determines the overload of the electric machine 8 thus determining the increase of intensity of the electric current supplied to the electric machine 8 as compared to the nominal intensity also according to the temperature of the electric machine 8. In other words, according to the temperature of the electric machine 8, the control unit 25 may limit the overload of the electric machine 8 (typically by compensating for the overload limitation of the electric machine 8 with a corresponding increase of the launch rotation speed) to prevent the electric machine 8 from being subjected to overheating, which could damage or overstress the electric insulations of the electric machine 8 itself. Therefore, beyond determined thresholds, the higher the temperature of the electric machine 8, the lower the increase of intensity of the electric current supplied to the electric machine 8 as compared to the nominal intensity.

If the cooling circuit of the electric machine 8 is in common with the cooling circuit of the thermal engine 5, the temperature of the electric machine 8 is estimated according to the temperature of the cooling liquid of the thermal engine 5 supplied by the temperature sensor 26. If the cooling circuit of the electric machine 8 is independent from the cooling circuit of the thermal engine 5, the temperature of the electric machine 8 is independently estimated by determining the temperature of the thermal engine 5 using a specific temperature sensor, or the temperature of the electric machine 8 is indirectly estimated by estimating an electric resistance of at least one stator minding of the electric machine 8 according to the voltage applied to the terminals of the stator winding and to the electric current which flows through the terminals of the stator winding, and thus estimating the temperature of the electric machine 8 according to the electric resistance of the stator winding of the electric machine 8.

It is worth noting that if the thermal engine 5 is "warm" when started, the overload of the electric machine 8 and/or the launch rotation speed could be cancelled; the choice of reducing/canceling the overload of the electric machine 8 or the launch rotation speed depends on either favouring the reduction of load stresses of the electric machine 8 (reduction/cancellation of the overload of the electric machine 8, a typical choice when the electric machine 8 is already "warm") or favouring the starting rapidity (reducing/canceling the launch rotation speed, a typical choice when the electric machine 8 is "cold").

Alternatively, the thermal engine 5 could be started when the vehicle 1 is moving by closing the clutch 15 (or one of the clutches 15 in the case of the double-clutch gear box in the embodiment in FIGS. 3 and 4) with a gear engaged in the gear box 10; in this case, the thermal engine 5 is rotated both by the torque generated by the electric machine 8 working as an electric motor and the kinetic energy possessed by the vehicle 1. Typically, if the thermal engine 5 is started while the vehicle 1 is moving (i.e. when starting at a traffic light), vehicle 1 can start moving forward by means of a merely electric traction and at a later time the drive shaft 6 of the thermal engine 5 may be connected to the rear driving wheels 3 by closing the clutch 15 (or one of the clutches 15 in the case of a double-clutch gear box in the embodiment in FIGS. 3 and 4).

The above-described method for starting the thermal engine 5 has many advantages.

Firstly, the above-described method for starting the thermal engine 5 allows rapid and effective starting of the thermal engine 5 in all conditions (i.e. when the thermal engine 5 is "cold" and when the thermal engine 5 is "warm") without excessively stressing (i.e. stressing more than required) the components of the transmission 7, and in particular the electric machine 8. Such a result is obtained by virtue of that the overload of the electric machine 8 and the launch rotation speed are not constant, but depend on the temperature of the thermal engine 5, thus they are adapted to the actual starting torque required by the thermal engine 5: when the thermal engine 5 is "cold", starting the thermal engine 5 requires the application of a very high torque (indicatively even 2-4 times higher than the starting torque needed to start a "warm" thermal engine) to the drive shaft 6, because due to the low temperature, the lubricant oil inside the thermal engine 5 is not very fluid and thus opposes a high mechanical resistance.

Furthermore, when the thermal engine 5 is "warm", the launch rotation speed may be reduced or even zero, thus starting the thermal engine 5 is particularly fast because there is no delay determined by the time needed to "idly" rotate the electric machine 8.

Finally, the above-described method for starting the thermal engine 5 is simple and cost-effective to be implemented even in an existing hybrid vehicle because it does not require the installation of additional physical components to those normally present and does not engage a great calculation power (therefore it does not require an power increase of the control unit 25).

The invention claimed is:

1. A method for starting an internal combustion thermal engine of a hybrid vehicle comprising:
   the thermal engine provided with a drive shaft;
   at least one pair of driving wheels;
   a transmission, which transmits the motion from the thermal engine to the driving wheels and comprises a clutch; and
   an electric machine, which is mechanically connected to the clutch transmission downstream of the clutch, so that the clutch is interposed between the electric machine and the thermal engine;
   the starting method comprises the steps of:
   opening the clutch to separate the electric machine from the thermal engine;
   separating the electric machine from the driving wheels;
   determining the temperature of the thermal engine;
   determining a launch rotation speed according to the temperature of the thermal engine;
   making the electric machine rotate by operating the electric machine as motor to reach the launch rotation speed;
   closing the clutch when the electric machine reaches the launch rotation speed; and
   determining a closing speed of the clutch according to the launch rotation speed.

2. The starting method according to claim 1, wherein the higher the launch rotation speed is, the higher is the closing speed of the clutch.

3. The starting method according to claim 1, wherein the lower the temperature of the thermal engine is, the higher is the launch rotation speed.

4. The starting method according to claim 1, and comprising the further step of overloading the electric machine during and/or after the closure of the clutch by powering the electric machine with an electric current of an intensity which is higher than the nominal intensity, so that the electric machine generates a torque which is higher than the nominal torque.

5. The starting method according to claim 4 and comprising the further step of determining the overload of the electric machine by determining the increase in the intensity of the electric current powered to the electric machine with respect to the nominal intensity according to the temperature of the thermal engine.

6. The starting method according to claim 5, wherein the lower the temperature of the thermal engine is, the higher the increase in the intensity of the electric current powered to the electric machine with respect to the nominal intensity.

7. The starting method according to claim 5 and comprising the further steps of:
    determining the temperature of the electric machine; and
    determining the overload of the electric machine by determining the increase in the intensity of the electric current powered to the electric machine with respect to the nominal intensity also according to the temperature of the electric machine.

8. The starting method according to claim 7 and comprising the further steps of:
    estimating an electric resistance of at least one stator winding of the electric machine according to the voltage applied to the terminals of the stator winding and according to the intensity of the electric current passing through the terminals of the stator winding; and
    estimating the temperature of the electric machine according to the electric resistance of the stator winding of the electric machine.

9. The starting method according to claim 7, wherein, according to the temperature of the electric machine, the overload of the electric machine is limited, in order to avoid exposing the electric machine to an excessive heating.

10. The starting method according to claim 9 and comprising the further step of compensating the limitation of the overload of the electric machine with a corresponding increase in the launch rotation speed.

11. The starting method according to claim 1, wherein the transmission comprises a gear box interposed between the electric machine and the driving wheels; and wherein in order to separate the electric machine from the driving wheels, the neutral gear of the gear box is engaged.

12. The starting method according to claim 11, wherein the gear box comprises at least one primary shaft which is mechanically connected to a shaft of the electric machine.

13. The starting method according to claim 12, wherein the transmission comprises:
    a transmission shaft which connects the drive shaft of the thermal engine to a primary shaft; and
    a bell which is integral to the thermal engine, is crossed by the transmission shaft of the transmission and houses in its inside the clutch and the electric machine.

\* \* \* \* \*